United States Patent [19]
Francardi

[11] 3,900,291
[45] Aug. 19, 1975

[54] APPARATUS FOR DETERMINING THE POINT OF COLOUR CHANGE IN VOLUMETRIC CHEMICAL ANALYSES

[75] Inventor: Mario Tullo Francardi, Bergamo, Italy

[73] Assignee: Italcementi S.p.A. Fabbriche Riunite Cemento, Bergamo, Italy

[22] Filed: Nov. 5, 1973

[21] Appl. No.: 412,622

[30] Foreign Application Priority Data
Dec. 29, 1972 Italy.................................. 33793/72

[52] U.S. Cl............................................... 23/253 R
[51] Int. Cl. ........................................... G01n 31/16
[58] Field of Search ......... 23/253 R, 259, 230 R, 23/230 (U.S. only), 23/253 A; 204/195 T

[56] References Cited
UNITED STATES PATENTS

| | | | |
|---|---|---|---|
| 3,284,164 | 11/1966 | Hach | 23/253 R |
| 3,440,016 | 4/1969 | Serfass | 23/253 R |
| 3,447,906 | 6/1969 | Zimmerli | 23/253 R |
| 3,716,334 | 2/1973 | Pont | 204/195 T X |
| 3,718,435 | 2/1973 | Tower | 23/253 R |
| 3,741,728 | 6/1973 | Sistig et al. | 204/195 T X |

*Primary Examiner*—Joseph Scovronek
*Attorney, Agent, or Firm*—Diller, Brown, Ramik & Wight

[57] ABSTRACT

Apparatus for the chemical titration of solutions and particularly for revealing the point of colour change, comprising a closed circuit including a container for the solution to be titrated and a feeder for the titrant solution, and a colour detecting cell with transparent walls inserted in said circuit upstream of the container, whereby the colour change upon adding the titrant solution is detected in a small volume of solution contained in said cell.

8 Claims, 3 Drawing Figures

APPARATUS FOR DETERMINING THE POINT OF COLOUR CHANGE IN VOLUMETRIC CHEMICAL ANALYSES

This invention relates to an apparatus for detecting the point of colour change of a titration in a volumetric chemical analysis.

In volumetric titrations used in analytical chemistry, the titrating solution is gradually introduced and mixed with the solution to be titrated, contained in a container (beaker, flask etc.) until no further colour change is observed. The colour changes may be due either to the nature of the reagents or to the addition of suitable indicators.

Furthermore one of the major problems connected with volumetric titration is notably that represented by the determination of the point of colour change, which, because of the small changes which occur as it is approached, leads to many uncertainties and consequent inaccuracies in the result.

The object of this invention is to provide an apparatus which enables the exact point of colour change of a volumetric titration to be determined with greater ease and precision than allowed by the normal visual estimation.

According to the invention this object is attained by an apparatus comprising a container for containing the solution to be titrated, a titrant solution feeder, a closed forced circulation circuit including said container, a mixer connected to said titrant solution feeder and included in said closed circuit, and a colour detection cell with transparent walls inserted in said closed circuit downstream of said mixer and upstream of said container in the direction of circulation of the solution to be titrated.

It is evident that by using an apparatus of this type, it is no longer the colour of the mixture contained in the container which is observed (where the colour changes are always very small, especially close to the point of colour change), but instead it is the colour of the smaller quantity of mixture contained in the cell located upstream of the container, where the colour changes are much more emphasised and it is hence much easier to determine with the required accuracy and reproducibility the exact point of colour change of the titration. Moreover, as will appear evident hereinafter, the displacement of the point of observation of the colour from the main container to a cell of small size gives the possibility, if required, of making the entire titrating operation automatic or at least semi-automatic.

The characteristics and advantages of the present invention will be illustrated by the detailed description given by way of example of some of its practical embodiments, with reference to the accompanying drawings in which.

Figure 1:
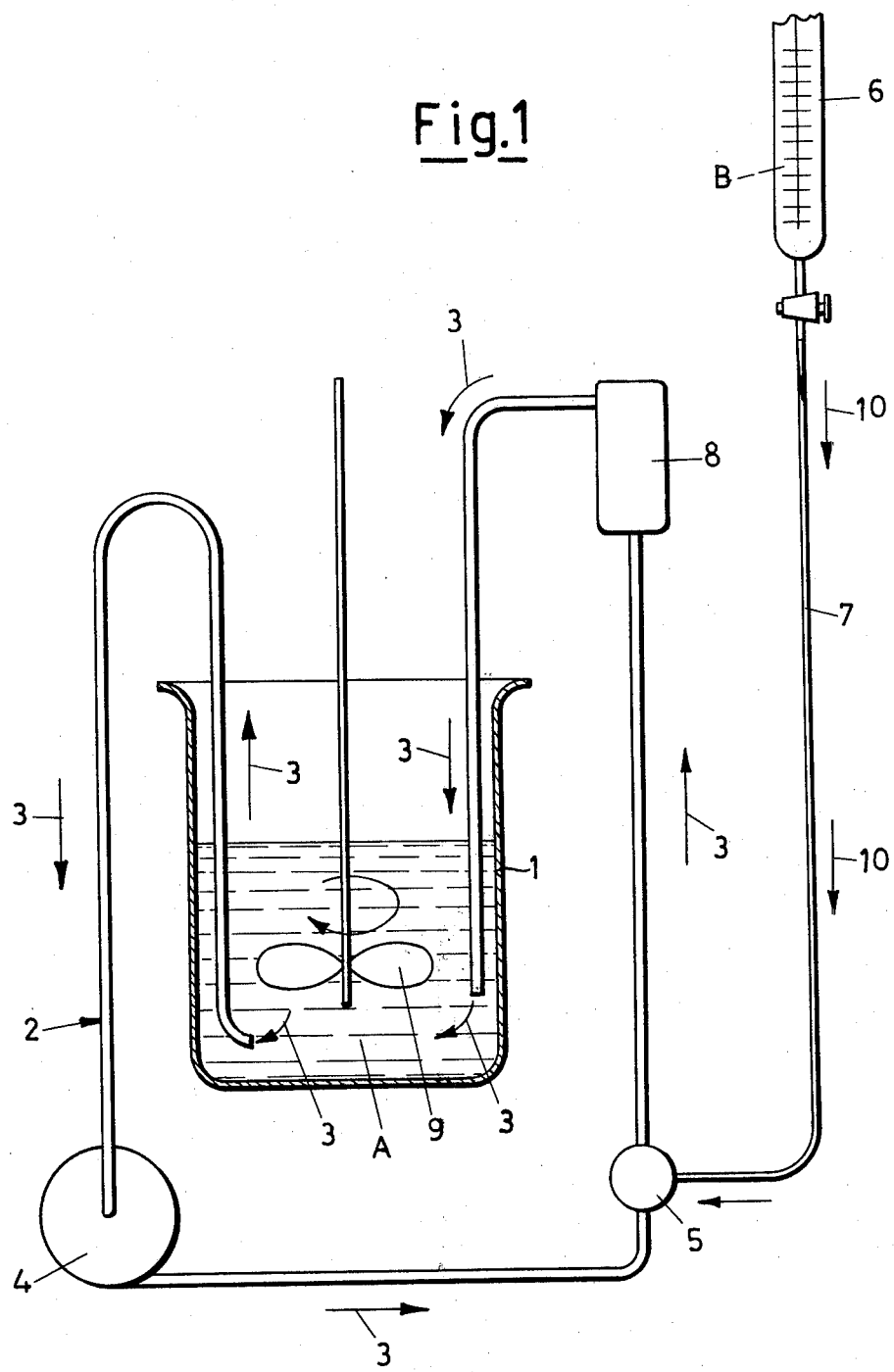
FIG. 1 is a diagrammatic view of a first embodiment of the apparatus according to the invention.

The apparatus shown in FIG. 1 comprises a container 1 for containing the solution to be titrated A, which is inserted in a closed circuit 2 arranged to provide the forced circulation of the solution A in the direction indicated by the arrows 3. This closed circuit comprises a pump 4, a mixer 5 connected to a feeder for titrant solution B composed of a burette 6 and a capillary tube 7, and a colour detection cell 8 with transparent walls. The apparatus is completed by an agitator 9 which rotates in the container 1, immersed in the solution to be titrated A.

The operation of the apparatus shown in FIG. 1 is as follows. The forced circulation created by the pump 4 means that small continually updated quantities of the solution to be titrated become mixed in the mixer 5 with the titrant solution fed in the direction of the arrows 10. The result of this mixing arrives at the cell 8, where the colour changes due to the successive additions of titrant solution can be easily and exactly observed. In fact, considering the small volume of the cell 8 and the small flow of fluid to it, it is necessary only to introduce a small quantity of titrant solution to create a zone in the flowing liquid in which, temporarily and locally, the colour change is complete already in the initial stage of titration. Each new introduction of titrant solution consequently creates a surge of different colour which, extending from the mixer 5, invades the cell 8 and then as it becomes dragged by the flow it dilutes and disappears into the mass of liquid contained in the container 1. This surge of colour, the colour of which is equal to that which the solution A will have at the end of titration, becomes increasingly more intense and large (for equal volumes of titrant solution introduced each time into the mixer 5) the more it approaches the point of colour change, so that through the cell 8 it is possible to observe a sharp and intense colour change for each introduction of titrant solution. Only when the entire solution A has reached the colour corresponding to the end of colour change will the further addition of titrant solution no longer give any change in colour in the cell 8. This indicates that the titration has finished.

Figure 2:
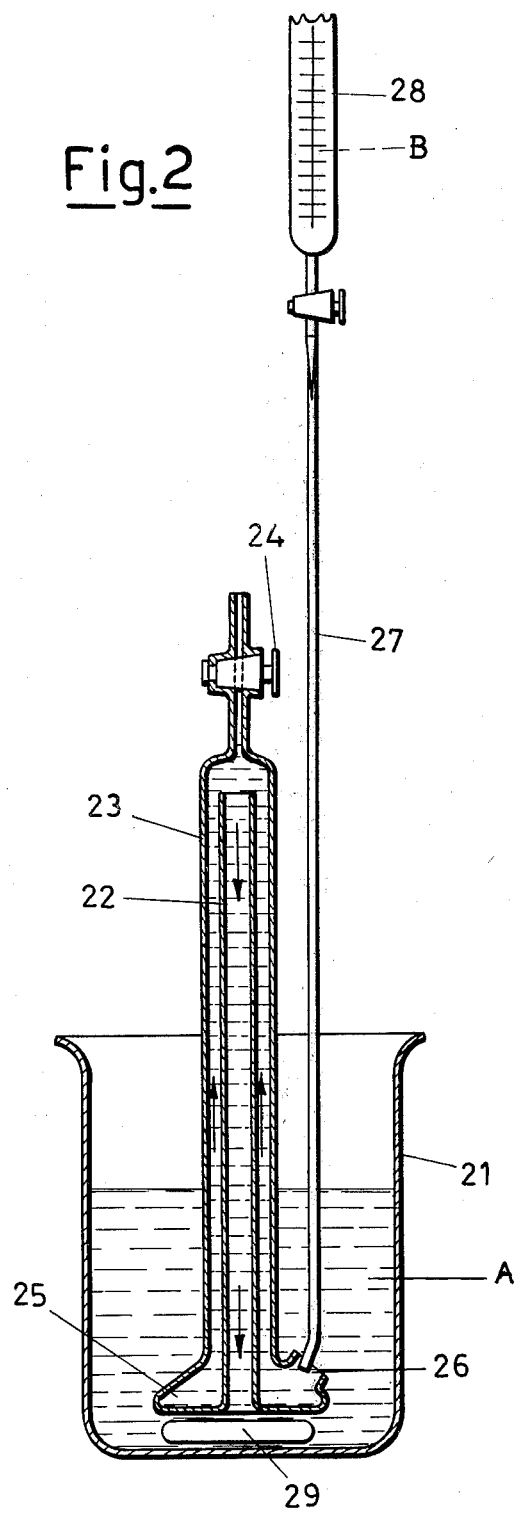
FIG. 2 is a diagrammatic view of a second embodiment of the apparatus according to the invention.

Conceptually analogous, even though structurally different, is the embodiment shown in FIG. 2 in which inside a container 21 filled with the solution to be titrated there is an assembly formed from two coaxial tubes 22 and 23, of which the first is open at both its ends and the second is closed upperly by means of a cock 24 and terminates lowerly with an enlarged base 25 provided with an aperture 26 through which a capillary tube from a burette 28 for feeding the titrant solution passes. Below the enlarged base 25 there is a magnetic agitator 29 which has the double purpose of forcing the circulation of the solution A through the closed circuit formed by the container 21 and the two coaxial tubes 22 and 23, and maintaining the solution contained in the container 21 in a state of agitation.

The operation of the apparatus shown in FIG. 2 is practically equal to that of the apparatus shown in FIG. 1. While the magnetic agitator 29 keeps the solution to be titrated A in circulation, the titrant solution B is gradually introduced into the enlarged base of the tube 23, (which thus acts as the mixer 5) to produce colour changes which are observed through the transparent wall of the tube 23, which together with the tube 22 acts as the cell 8. More precisely, the rotation of the agitator 29 produces a negative pressure in front of the lower aperture of the tube 22 and consequently the liquid contained in the container 21 is obliged to enter the enlarged base 25 of the tube 23 through the aperture 26, then rise again through the interspace between the two tubes 22 and 23, descend through the internal tube 22 and finally return to the container 21. Each introduction of titrant solution through the capillary tube 28 gives a surge of colour which after having taken the path indicated above finishes by dispersing in the liquid in the container 21, which the agitator 29 maintains in continuous agitation. By observing the upper part of the tube 23, it is possible to detect very easily and distinctly all colour variations which occur during the course of a titration. Only at the end of the titration, i.e. when the colour changes are completed, will there be no further colour change.

Both the embodiment shown in FIG. 1 and that shown in FIG. 2 (and generally the apparatus according to the invention) are perfectly suitable for complete automation. As the colour detection cell is small and is separate from the container of the solution to be titrated, it is fairly easy to provide it with suitable sensing means connected to a member for controlling the feed of titrant solution.

Figure 3:
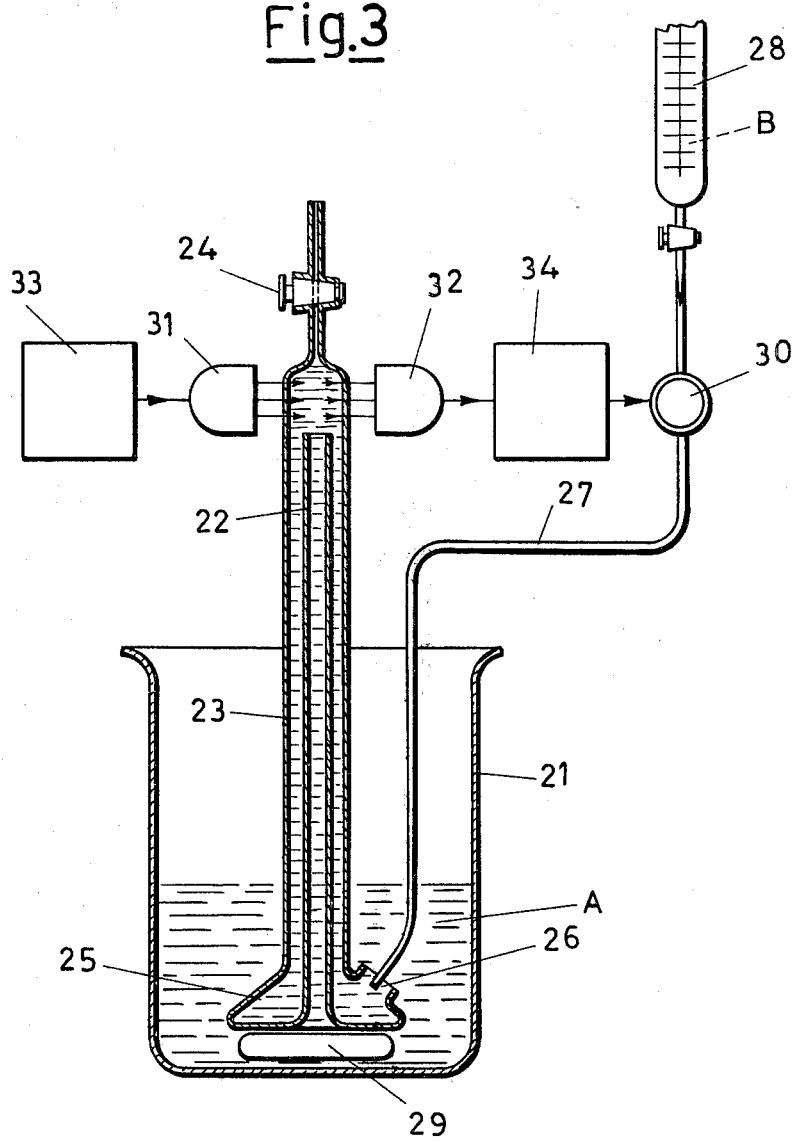
FIG. 3 is a diagrammatic view of a third embodiment of the apparatus according to the invention.

An example of this is represented by the embodiment shown in FIG. 3, in which an apparatus exactly similar to that of FIG. 2 (and consequently indicated by the same reference numerals) is coupled to a control system formed from a solenoid valve 30 connected in the capillary tube 27, a lamp 31 and a photosensitive element 32 arranged on opposite sides of the upper part of the tube 23, a stabilised electrical supply unit 33 connected to the lamp 31 so as to maintain the luminosity constant, and an amplifier 34 connected between the photosentitive element 32 and solenoid valve 30.

It is evident that each colour change which takes place in the detection cell causes a variation in the electrical signal at the outlet of the photosensitive element 32. Each electrical variation, suitably amplified by the amplifier 34, momentarily opens the solenoid valve 30 through which a suitably determined quantity of titrant solution is introduced into the mixer 25. This introduction of titrant gives rise to a colour change in the detection cell, and thus a new electrical variation at the outlet of the photosensitive element, and therefore a new introduction of titrant. This succession of interdependent phenomena terminates only when the end of the titration is reached, in other words when an introduction of titrant is no longer followed by a colour change (colour change concluded).

This simple apparatus is able to make the titration process completely automatic, so that the only task of the operator is in starting the titration, which then proceeds in a self-sufficient manner until its conclusion under the rigorous and objective control of an electrical circuit, instead of being entrusted to the subjective judgment of the human eye.

Without going as far as the complete automation described above, it is possible to arrange the apparatus such that it emits a convenient signal (optical, acoustic etc.) each time a colour change takes place in the detection cell, while leaving the feed of the titrant entrusted to the operator who, by pushing a pushbutton, opens or closes the solenoid valve 30. In this case the operator is greatly aided in his task because he is no longer required to make decisions, but only to ensure the progress of the titration as the control signal is given.

What I claim is:

1. An apparatus for detecting the point of colour change in a volumetric chemical analysis, comprising a container for containing the solution to be titrated, a titrant solution feeder, flow defining means forming a closed forced circulation circuit having an inlet and a return in said container, a mixer connected to said titrant solution feeder and included in said closed circuit for introducing a titrant solution to a solution being circulated within said closed circuit, said closed circuit including a colour detection cell with transparent walls downstream of said mixer and upstream of said return in the direction of circulation of a solution to be titrated, said colour detection cell being separated from said container and of a reduced size with respect to said container.

2. An apparatus as claimed in claim 1, together with an agitator within said container.

3. An apparatus as claimed in claim 2, in which a phototransmitting element and a photoreceiving element are disposed at two opposite sides of the detection cell, a control member connected in said titrant solution feeder, and said photoreceiving element being connected to said control member for actuating the same.

4. An apparatus as claimed in claim 1, in which a phototransmitting element and a photoreceiving element are disposed at two opposite sides of the detection cell, the second of which is connected to a control member connected in said titrant solution feeder.

5. An apparatus as claimed in claim 1 wherein said flow defining means includes concentric tubes each having a lower end within said container for communication with a solution contained therein, said tube lower ends defining said inlet and said return, said outer tube having a portion extending above said inner tube with said inner tube having an open upper end in communication with said upper portion, and said outer tube portion forming said transparent walls of said colour detection cell.

6. An apparatus as claimed in claim 5 wherein said tubes have a combined enlarged base, and said inlet and return being formed in said base.

7. An apparatus as claimed in claim 5 wherein said tubes have a combined enlarged base, said inner tube opening downwardly through said base to define said return, and said base having an upwardly facing opening defining said inlet.

8. An apparatus according to claim 7 wherein agitator means are disposed within said container below said base for effecting circulation of solution through said tubes from said inlet to said return.

* * * * *